Aug. 2, 1932.   J. E. SHRADER   1,869,828
DEVICE FOR MEASURING AND RECORDING VIBRATIONS
IN THREE DIRECTIONS SIMULTANEOUSLY
Filed Feb. 2, 1929   4 Sheets-Sheet 1

WITNESS:

INVENTOR
James E. Shrader
BY
Augustus B. Stoughton
ATTORNEY.

Aug. 2, 1932.  J. E. SHRADER  1,869,828
DEVICE FOR MEASURING AND RECORDING VIBRATIONS
IN THREE DIRECTIONS SIMULTANEOUSLY
Filed Feb. 2, 1929    4 Sheets-Sheet 2

WITNESS:

INVENTOR
James E. Shrader
BY
Augustus B. Stoughton
ATTORNEY.

Aug. 2, 1932.  J. E. SHRADER  1,869,828
DEVICE FOR MEASURING AND RECORDING VIBRATIONS
IN THREE DIRECTIONS SIMULTANEOUSLY
Filed Feb. 2, 1929   4 Sheets-Sheet 3
FIG.5
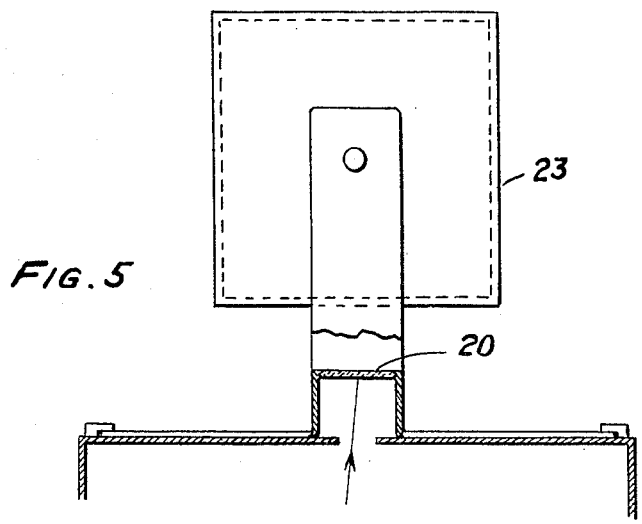
FIG.6.
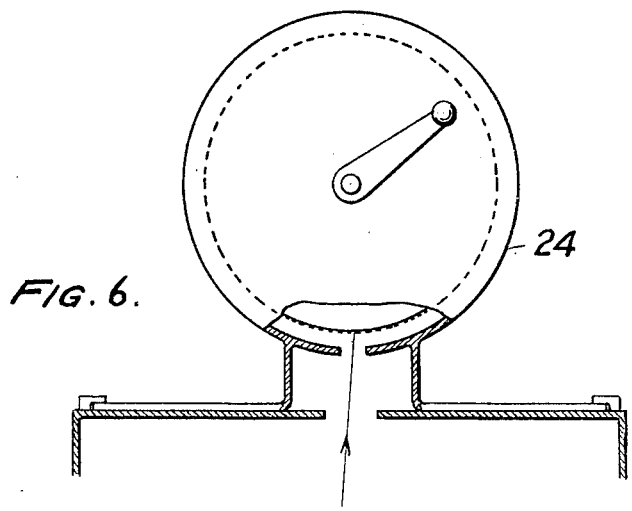
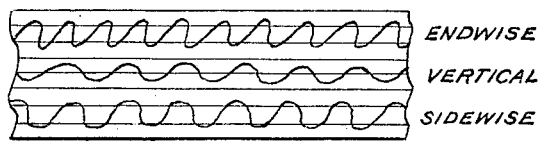
FIG.7.
WITNESS:
INVENTOR
James E. Shrader
BY
Augustus B Stoughton
ATTORNEY.

Aug. 2, 1932.   J. E. SHRADER   1,869,828
DEVICE FOR MEASURING AND RECORDING VIBRATIONS
IN THREE DIRECTIONS SIMULTANEOUSLY
Filed Feb. 2, 1929   4 Sheets-Sheet 4

WITNESS:

INVENTOR
James E. Shrader
BY
Augustus B. Stoughton
ATTORNEY.

Patented Aug. 2, 1932

1,869,828

UNITED STATES PATENT OFFICE

JAMES EDMOND SHRADER, OF DREXEL HILL, PENNSYLVANIA

DEVICE FOR MEASURING AND RECORDING VIBRATIONS IN THREE DIRECTIONS SIMULTANEOUSLY

Application filed February 2, 1929. Serial No. 336,976.

Vibration problems during the last few years have become of greater importance because of the increasing size of rotating machinery and because of the increasing demands that such machines maintain their stability. Especially is this true in the case of the huge turbo generators which are being built and installed in recent years. The cost of such machines is great and at this time when so much of our economic life is dependent upon electric service it is especially important that these expensive units give the greatest output of which they are capable without excessive wear and tear and that such service should be uninterrupted. If such a machine should become unbalanced, service with that unit must be discontinued and it must be overhauled or the life of the machine will be shortened, due to excessive wear and because of the mechanical strains resulting from excessive vibration.

To a great extent in the past and even to a large extent at the present time, the correction of machines for vibration has been left to the individual judgment of the engineer based upon his physical sensations of touch, sight and hearing, which sensations cannot be relied upon with certainty. To really make progress in any field it becomes necessary to put knowledge on a quantitative basis, so therefore in order to prevent and cure excessive vibrations in any machine some more reliable means of measuring vibrations must be devised.

From time to time a number of such devices have been made which have been very useful. The demands made upon such a piece of apparatus, if it fulfills all the functions required of it, are that it should show, first, amplitude of vibration, second, frequency of vibration, third, kind of vibration, simple or complex, and fourth, phase relations of vibration in three dimensions.

The more common instruments used merely indicate the amplitude of vibration. Others record amplitude and frequency of vibration though it is doubtful whether a pen recorder would indicate anything except the simplest form of vibration and would fail to show harmonics. To my knowledge no simple apparatus has been devised which shows amplitude, frequency, wave form and phase relations in three dimensions simultaneously.

Objects of the present invention are to provide a piece of apparatus which will give a permanent record of the quantities enumerated above for comparison from time to time, and further to provide a device which is simple and can be operated with the minimum requirement of skill on the part of the operator.

The seismograph principle of relative motion between a heavy suspended mass and the frame of its support has long been employed in an instrument for detecting and measuring vibration. Many schemes have been used for showing or recording this relative motion. Some have used multiplying levers and others have used radio inductive coupling with amplification in connection with oscillographic recording apparatus.

An instrument embodying features of the invention employs the seismograph principle of relative motion between a heavy mass and a frame from which it is supported by a system of springs. This motion is multiplied by changing linear displacement of the frame which moves with the vibrating body into angular displacement of a beam of light, which is reflected from a mirror mounted on the moving system.

The invention also comprises the improvements to be presently described and finally claimed.

In the following description reference will be made to the accompanying drawings forming part hereof and in which Figure 1 is a side view, with the cover of the case removed, of an instrument embodying features of the invention.

Fig. 5 is a view partly in section and partly in elevation illustrating a rotating mirror instead of the screen shown in Figs. 1 and 2.

Fig. 6 is a view similar to Fig. 5 showing a photographic recorder instead of the mirror of Fig. 5.

Fig. 7 is a highly diagrammatic view illustrative of the graph obtained in Fig. 6 and of the image seen in the rotating mirror, Fig. 5.

Figure 2:
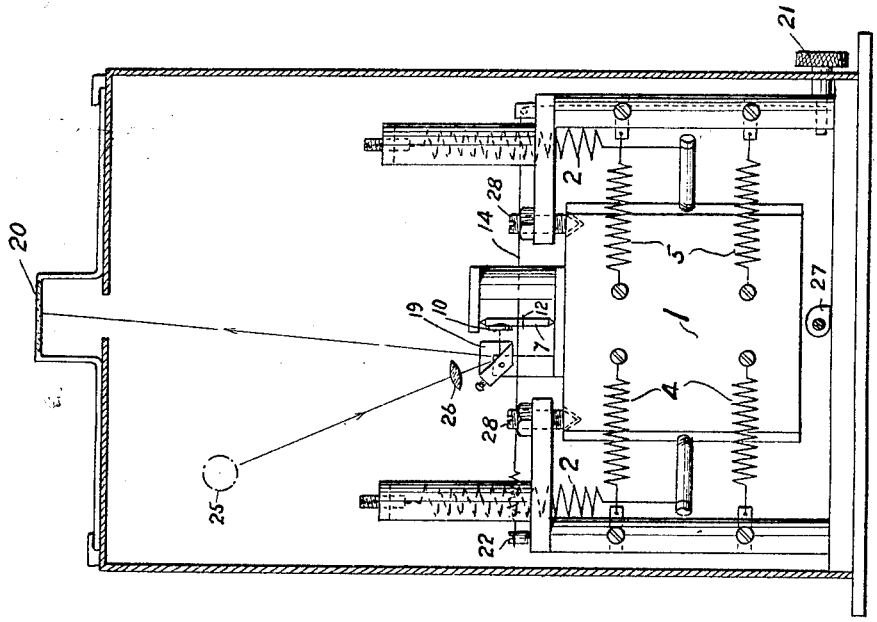
Fig. 2 is a similar view taken at right angles to Fig. 1 with parts in section.

The suspended mass 1 is of the form of a cube and illustratively weighs about nine pounds. This mass is supported and held in equilibrium in three directions by spiral springs of piano wire. Four springs 2 attached near the corners of the top face of the cube support the mass against the opposing force of gravity. On each vertical face 3 are two pairs of opposing springs 4 and 5 holding the mass in each of two horizontal directions at right angles to each other. All these springs are identical so that when the mass and frame are displaced with reference to each other the displacement takes place opposed by equal forces in each of three directions at right angles to each other.

To indicate relative motion between the mass and its supporting frame three small shafts 6, 7 and 8 carrying mirrors 9, 10 and 11 are supported in jewelled bearings, on top of the mass. A phosphor bronze strip or strong light string 12 is wrapped about one of these shafts 6, which is mounted in a vertical position. The spring 12 has one end fastened directly to one side of the frame and the other end by means of a light spiral spring 13 to the other side of the frame. When relative motion takes place between the mass and the frame, the shaft is rotated deflecting a spot of light from the mirror 9 upon a suitable scale. A transparent scale graduated directly in spaces, by means of lines, is suitable. In the same manner by providing a strip or string 14 in a horizontal direction at right angles to the former, the vibrations in the other horizontal direction are indicated on the same scale by the mirror 10.

Figure 1:
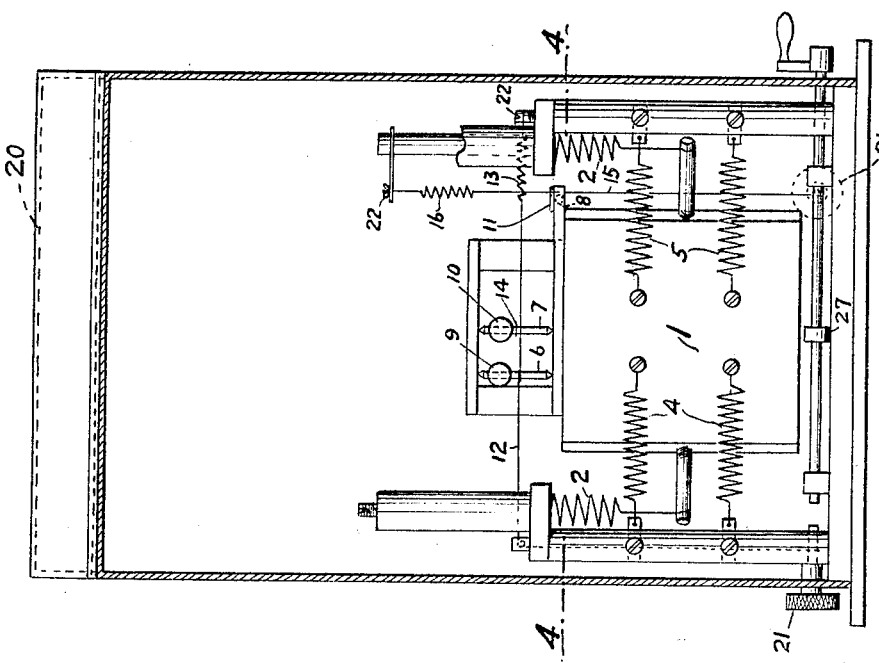
Figure 3:
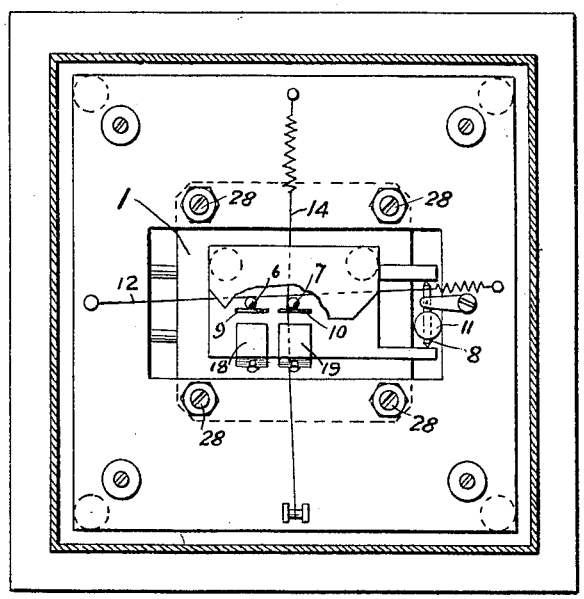
Fig. 3 is a top or plan view with parts removed.
Figure 4:
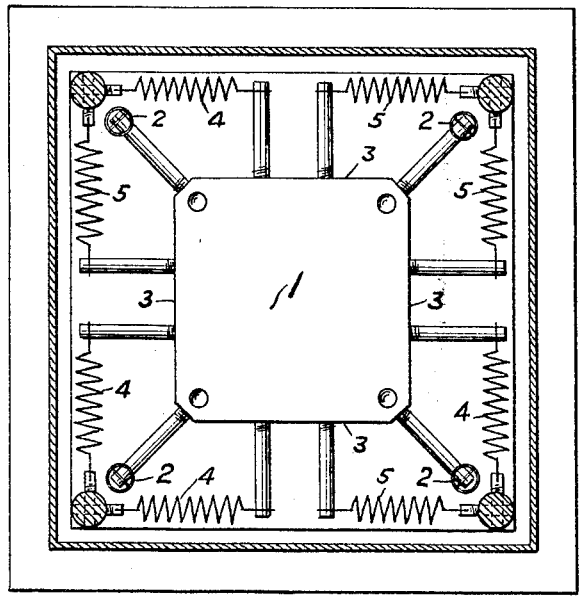
Fig. 4 is a sectional view taken on the line 4—4 of Fig. 1.

To indicate vibrations in a vertical direction the third mirror shaft 8 is mounted in a horizontal position, Fig. 3, and the actuating string or strip 15, Fig. 1, and spiral spring 16 are held in a vertical position being held above and below the mirror shaft 8, supporting mirror 11. To bring all deflections on the same scale and alongside of each other, use is made of two right angled prisms 18 and 19 for changing the direction of the beams of light from the mirrors 9 and 10, and bringing them to a scale 20, on top of the instrument, Figs. 1 and 2. The mirror 11 is so mounted that its beam of light is brought directly to this scale.

Proper tension on the actuating strips or strings is secured, in such case, through the spiral springs by an adjusting pin 22 about which the free end of the strip or string is wrapped. A second adjusting pin 21 at the other free end of the strip or string serves to adjust the position of the spot of light upon the scale. For convenience in removing the case of the instrument the latter adjusting pins 21 are located at the base of the instrument where they are readily accessible.

One lamp 25 serves for all three mirrors. The lamp is more readily placed above and in front of the mirrors and the direction of the beam of light is changed by the right angled prisms in front of the mirrors, and the light is brought to a focus by a small lens 26.

To limit the motion of the suspended mass and to clamp it during transportation, the instrument is provided with a cam 27, which lifts the mass upward against four projecting screws 28 with conical ends which engage conical pits in the top of the cube.

The instrument may be provided with a scale 20, or a rotating mirror 23, Fig. 5 or a photographic recorder 24, Fig. 6, all these being interchangeable. The cleats (unnumbered) shown to the right and to the left at the top of Figures 2, 5 and 6 are one means for permitting any of the said observation means to be substituted in place of another. By means of the scale 20 amplitudes of vibration may be observed. With the rotating mirror, amplitude of vibration, wave form and phase relation Fig. 5 may be observed visually. With the photographic film a permanent record may be made of amplitude, wave form and phase relation, and by constant drive of film or by standard of time reference, frequency of vibration may be determined.

Means are provided for actuating the mirror or film drum but such means per se form no part of the present invention and are therefore neither shown nor described.

Assuming that the frame of the instrument moves with the vibrating body to which it is firmly connected, as by bolts, screws, clamps or the weight of the instrument, and that because of its inertia the suspended mass remains stationary, the actual motion of the vibrating body may be obtained from the deflection of the spot of light on the scale.

When vibration occures the linear displacement in any direction is changed to angular rotation of the mirror shaft.

To measure amplitudes of vibration with a fair degree of accuracy, the natural frequency of vibration of the suspended mass should be kept as low as possible.

Figures 8, 9:
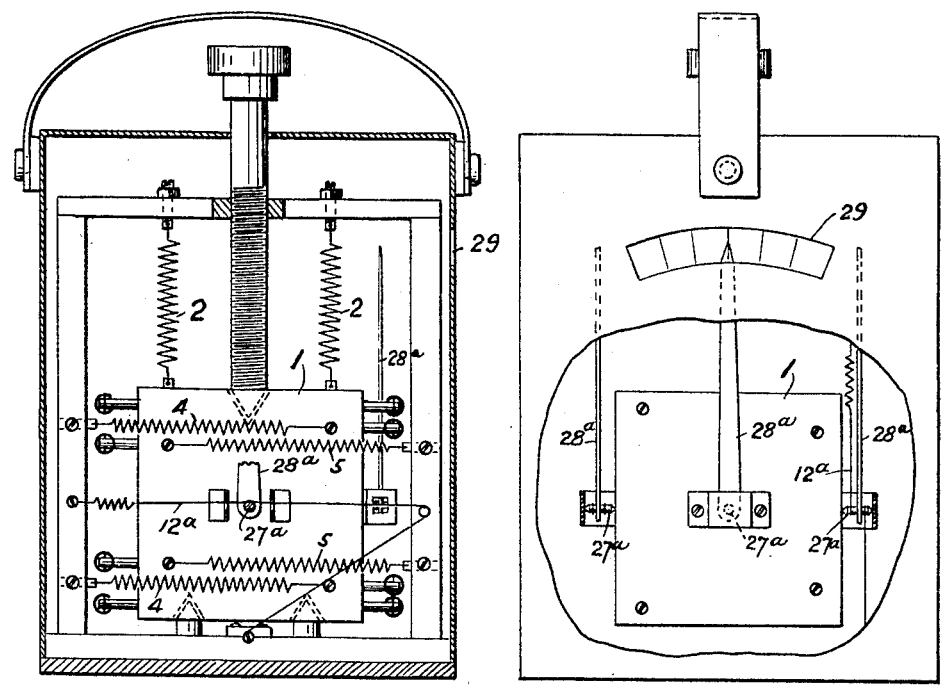
Fig. 8 is an elevational view partly in section illustrating a modification.
Fig. 9 is a side view of Fig. 8 with parts broken away.
Figure 10:
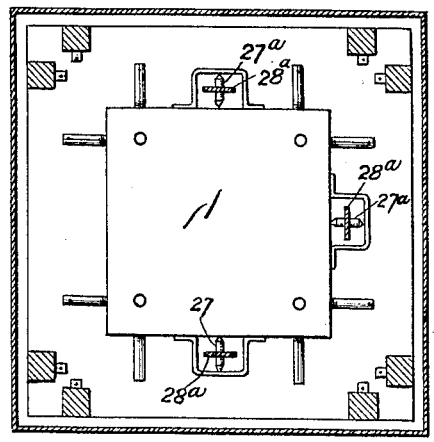
Fig. 10 is a horizontal sectional view with the springs and wires omitted.

The construction and mode of operation of the modification shown in Figs. 8, 9 and 10 are as above described, except that the strings 12ª, secured at their ends to the frame, are wrapped around the spindles 27ª of the three pointers 28ª carried by the mass 1. These pointers are visible through windows 29. In this case the indications are not brought to a common location, but the advantages of the described spring suspension and of the string or wire actuated indicating mechanism are retained.

Attention may be directed to the following; First, the described instrument records amplitude, frequency, wave form and phase relations of vibration in three dimensions simultaneously without change in position or adjustment.

Second, the pointer is a beam of light and has no inertia. The only inertia in the recording device is that of a small mirror and shaft. The shaft is so mounted that there is but little friction in its bearings.

Third, magnification of motion is confined to one moving part, that of the small shaft carrying the mirror, and the sensitivity of the instrument may be adjusted to a desired value by changing the radius of this shaft.

Fourth, the instrument is simple and with ordinary care has nothing to get out of order.

Fifth, this instrument is self-contained and requires no auxiliary apparatus.

Sixth, the instrument is readily operated by an unskilled operator.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. An instrument of the type recited comprising a frame, a mass, a system of springs suspending the mass from the frame for relative movement of the mass and frame in any direction, and a light reflecting system mounted on the mass and connected to the frame and responsive to the relative movements of the frame and mass and adapted to provide three beams of light respectively vibratory in the same plane and substantially showing the components in three directions of the relative movements of the frame and mass.

2. An instrument of the type recited comprising a frame, a mass, a system of balanced springs suspending the mass from the frame, spindles mounted on the mass and of which two are turnable about vertical axes and of which one is turnable about a horizontal axis, mirrors mounted on the spindles, flexible connectors connected at their ends with the frame and respectively wrapped around the spindles of the mirrors and of which two are disposed horizontally and at right angles to each other and of which the third is disposed vertically, a scale provided at the top of the frame, a source of light, and optical means carried by the mass for changing the direction of beams of light to bring them to said scale.

3. An instrument of the type recited comprising a frame, a cubic mass, a system of balanced springs suspending the mass from the frame, spindles mounted on the mass and of which two are turnable about vertical axes, and of which one is turnable about a horizontal axis, mirrors mounted on the spindles, flexible connectors connected at their ends with the frame and respectively wrapped around the spindles of the mirrors and of which two are disposed horizontally and at right angles to each other and of which the third is disposed vertically, a source of light, a scale at the top of the frame, and prisms for changing the direction of beams of light to bring them to said scale.

4. An instrument of the type recited comprising a frame, a mass, a system of balanced springs suspending the mass from the frame for relative movement of the mass and frame in any direction, three spindles turnably mounted on the mass, flexible connectors arranged at right angles to each other and connected at their ends with the frame and respectively wrapped around said spindles, and optical means for actuation by the respective spindles and responsive to vibrations in three directions.

JAMES E. SHRADER.